US012595079B2

(12) United States Patent　(10) Patent No.:　US 12,595,079 B2
Gocmen et al.　(45) Date of Patent:　Apr. 7, 2026

(54) SATELLITE SYSTEM WITH TABLE AND FOLDABLE PANELS PRODUCED BY ADDITIVE MANUFACTURING

(71) Applicant: TUSAS—TURK HAVACILIK VE UZAY SANAYII ANONIM SIRKETI, Ankara (TR)

(72) Inventors: Zeynep Ozge Gocmen, Ankara (TR); Onur Cakmakci, Ankara (TR); Hasan Soycan, Ankara (TR)

(73) Assignee: TUSAS-TURK HAVACILIK VE UZAY SANAYII ANONIM SIRKETI, Ankara (TR)

( * ) Notice: Subject to any disclaimer, the term of this patent is extended or adjusted under 35 U.S.C. 154(b) by 264 days.

(21) Appl. No.: 18/266,933

(22) PCT Filed: Apr. 27, 2021

(86) PCT No.: PCT/TR2021/050396
§ 371 (c)(1),
(2) Date: Jun. 13, 2023

(87) PCT Pub. No.: WO2022/146279
PCT Pub. Date: Jul. 7, 2022

(65) Prior Publication Data
US 2023/0406545 A1　Dec. 21, 2023

(30) Foreign Application Priority Data
Dec. 28, 2020　(TR) ................................. 2020/22063

(51) Int. Cl.
*B64G 1/22*　(2006.01)
*B33Y 10/00*　(2015.01)
*B33Y 80/00*　(2015.01)

(52) U.S. Cl.
CPC ................ *B64G 1/22* (2013.01); *B33Y 80/00* (2014.12); *B33Y 10/00* (2014.12)

(58) Field of Classification Search
CPC .......... B64G 1/10; B64G 1/22; B64G 1/2222; B64G 1/223
See application file for complete search history.

(56) References Cited

U.S. PATENT DOCUMENTS

| | | | | |
|---|---|---|---|---|
| 5,927,654 | A * | 7/1999 | Foley ....................... | H01Q 1/28 244/172.6 |
| 10,315,784 | B2 * | 6/2019 | Leonard ................... | B64G 1/10 |

(Continued)

FOREIGN PATENT DOCUMENTS

CN　111762338 A　10/2020

OTHER PUBLICATIONS

Esser, C., Foldable Articulated CubeSat for Additive Manufacturing, GRABCAD Jun. 22, 2015 https://grabcad.com/library/foldable-articulated-cubesat-for-additive-manufacturing-1 (Year: 2015).*

(Continued)

*Primary Examiner* — Arfan Y. Sinaki
(74) *Attorney, Agent, or Firm* — Notaro, Michalos & Zaccaria P.C.

(57)　ABSTRACT

A satellite system has a table on which additive manufacturing is carried out. A plurality of panels are produced by the additive manufacturing method and surround a plurality of satellite elements such as payload, satellite electronic circuits and mechanisms such that they protect the satellite elements from space conditions, wherein satellite elements are mounted on the panels in a removable manner. At least one hinge allows the panels to rotate around each other, and produced by additive manufacturing method in an integrated manner with the panels.

5 Claims, 3 Drawing Sheets

(56) References Cited

U.S. PATENT DOCUMENTS

| | | | |
|---|---|---|---|
| 10,811,777 B1 | 10/2020 | Fuchi et al. | |
| 11,873,119 B1 * | 1/2024 | Duron ................. | H05K 7/1424 |
| 2015/0210408 A1 | 7/2015 | Dunn et al. | |
| 2017/0294698 A1 | 10/2017 | Cho et al. | |

OTHER PUBLICATIONS

Minetola, P., FoldSat, GRABCAD, Jun. 22, 2015 https://grabcad. com/library/foldsat-1 (Year: 2015).*
Esser, Chris; Foldable Articulated CubeSat for Additive Manufacturing; https://grabcad.com/library/foldable-articulated-cubesat-for-additive manufacturing-1; Jun. 22, 2015.
Zanette, Luca, et al.; "Swarm system for CubeSats" ; Aircraft Engineering and Aerospace Technology, May 2018;. 90(2):379-389.
International Search Report and Written Opinion for PCT application No. PCT/TR2021/050396, mailed Jul. 16, 2021.
International Preliminary Report on Patentability, completed Apr. 5, 2023.
Demand/Request for Preliminary Examination dated Oct. 24, 2022.
Written Opinion of the International Preliminary Examining Authority mailed Nov. 30, 2022.
Response to Communication of Nov. 30, 2022, dated Jan. 20, 2023.
International Application Status Report generated May 9, 2023.
Written Opinion of the International Preliminary Examining Authority mailed Feb. 14, 2023.
Response to Communication of Feb. 14, 2023, dated Mar. 6, 2023.
Boschetto, Alberto, et al.; "Selective laser melting of a 1U cubesat structure. Design for additive manufacturing and assembly." Acta Astronautica (2019); 159:377-384.

* cited by examiner

SATELLITE SYSTEM WITH TABLE AND FOLDABLE PANELS PRODUCED BY ADDITIVE MANUFACTURING

FIELD

The present invention relates to production of a satellite system used for space missions.

BACKGROUND

Production and assembly operations, which take a long time in satellite platform development process, causes significant constraints on the projects in terms of cost and schedule. When designed and produced by conventional methods, satellite platforms require use of a large number of structural parts, fasteners and other auxiliary assembly elements, thus extending the time to obtain the final product. At the same time, since the number of auxiliary fasteners for assembly increases, the satellite mass also increases in direct proportion.

Conventional methods used in production processes are machining, sheet metal production techniques, composite material production processes, etc., wherein these technologies limit the final geometry of the components. On the other hand, additive manufacturing technologies, which have been developing rapidly, enable the production of complex geometries and integrated parts that cannot be produced by conventional methods. In this context, size of the final part and the amount of raw powder material used are the main limiting factors in production time and cost.

The article titled "Boschetto, Alberto, et al. "Selective laser melting of a 1U cubesat structure. Design for additive manufacturing and assembly." Acta Astronautica 159 (2019): 377-384", which is included in the known-state of the art, discloses production of 1U cubesat nano satellites by additive manufacturing. According to the document, panels and hinges of the satellite are produced in an integrated manner, and the panels are assembled without using an additional connecting piece.

The document titled "Foldable Articulated CubeSat for Additive Manufacturing" (Chris Esser) (grabcad.com/library/foldable-articulated-cubesat-for-additive-manufacturing-1), which is included in the known-state of the art, discloses the additive manufacturing of foldable, articulated cube satellites. In the document, it is stated that the cube satellite is produced openly with hinges. After production, it is folded into a cube form. After being formed into cube, the panels are fixed by means of screws. In the document, it is also stated that the need for support materials and post-production processes is minimized thanks to the structure of the hinges. Panels can be kept stable during assembly by using snap-fit structures in the folding process. However, openly production of cube satellites requires much more area and accordingly reduces production efficiency by increasing the production costs.

In the published patent document no US2017294698A1, functionalized micro-scale 3D devices and methods of making the same are disclosed. The 3D micro device can be realized with the combination of top-down (lithographic) and bottom-up (origami-inspired self-assembly) processes. The origami-inspired self-assembly approach combined with a top-down process can realize 3D micro-scale polyhedral structures with metal/semiconductor materials patterned on dielectric materials.

In the other patent document no US2015210408A1, a method for partially or completely manufacturing a spacecraft in an extraterrestrial environment is disclosed. Thanks to the method the spacecraft is allowed to be transported from Earth in a form that is better able to withstand forces associated with a rocket launch and traversing Earth's atmosphere. Such a form may allow the spacecraft to be significantly smaller than it would need to be if it had to be in a completed form at the time of transportation.

Yet another published patent document no CN111762338A discloses a folding flat satellite configuration. The folding flat satellite configuration comprises a folding flat satellite body comprising a first satellite cabin body and a second satellite cabin body; a connector used for connecting the first satellite cabin body and the second satellite cabin body. The angles between opposite sky surfaces of the first satellite cabin body and the second satellite cabin body can be adjusted and the two cabins of the satellite can be folded or unfolded so as to be placed in a fairing in a stacked mode and adapt to different fairing sizes. Accordingly an extremely high fairing space utilization rate is achieved, "one-rocket multi-satellite" launching with a high numerical proportion is achieved, rapid and low-cost deployment of satellite constellation is guaranteed, and therefore the two problems of satellite launching period requirements and cost control requirements are solved. And the configuration has characteristics of a large ground area and multiple heat dissipation surfaces.

In the other patent document no U.S. Pat. No. 10,811,777B1, an antenna array including a foldable substrate having a plurality of fold lines arranged in a Miura-ori folding pattern, and a plurality of antenna elements interconnected by an electrical trace and disposed on the substrate is disclosed. The substrate containing the plurality of antenna elements is to fold according to a one-step Miura-ori folding pattern sequence, and the plurality of antenna elements directs an antenna beam with a range of directivities caused by a folding of the substrate according to the one-step Miura-ori folding pattern sequence. The plurality of antenna elements may be non-overlapping prior to the folding of the substrate.

The document titled "Swarm system for CubeSats" (Luca Zanette, Leonardo Reyneri, Giuseppe Bruni), (Aircraft Engineering and Aerospace Technology, Vol. 90 Issue: 2, pp. 379-389. DOI: 10.1108/AEAT-07-2016-0119 23), which is included in the known-state of the art, discloses a system that is able to establish an inter-satellite communication crosslink and to determine the mutual physical positioning for CubeSats belonging to a swarm. Furthermore in the document, the use of a deployable structure which is able to increase the external surface of CubeSats is presented. Accordingly, this allows gaining the interspace between elements of the smart-antenna.

SUMMARY

Thanks to a satellite system according to the present invention, it is possible to produce satellites with additive manufacturing in much smaller production areas.

Another object of the present invention is to reduce satellite production and assembly periods.

The satellite system realized to achieve the object of the invention and defined in the first claim and the claims dependent thereon comprises a table where additive manufacturing is carried out; a plurality of panels which are produced by the additive manufacturing method and surround the satellite elements such as satellite electronic circuit boards, heat pipes, communication systems, fuel and batteries, etc. such that they protect the satellite elements from temperature changes in space and small pieces of debris in orbit, wherein satellite elements are mounted to the panels; at least one hinge which allows the panels to move around each other relative to each other and produced by additive manufacturing method together with the panels.

The satellite system of the invention comprises panels stacked on top of each other in a horizontal plane such that they are opposite to each other.

In an embodiment of the invention, the satellite system comprises panels produced on the table as folded, with the surfaces thereof almost completely opposite and overlapping each other during production by additive manufacturing. Thus, the table sizes required for the production of the satellite system is reduced, the number of additive manufacturing production platforms that can produce a satellite system is increased, and production is carried out with cheaper production platforms.

In an embodiment of the invention, the satellite system comprises panels which are folded and overlapped by means of hinges and are located almost completely parallel to each other such that they are opposite to each other.

In an embodiment of the invention, the satellite system comprises panels which have a first position (I) in which the panels are produced as folded in an almost completely opposite and overlapping manner, a second position (II) in which the panels are unfolded from the first position (I) by rotating the panels around each other relative to each other by means of the hinges and during which the satellite elements are mounted, and a third position (III) which are mechanically fixed to each other by fasteners such as pins and bolts by folding one side open from the second position (II) or to be an almost completely closed prism.

In an embodiment of the invention, the satellite system comprises panels which are mechanically connected to maximum two panels by means of hinges, wherein only the surfaces of the panels to which they are mechanically connected are opposite and overlapping.

In an embodiment of the invention, the satellite system comprises a third position (III) in which quadrangle panels are joined to form a rectangular prism.

In an embodiment of the invention, the satellite system comprises at least one recess which is located on the panel, on a surface and allows the satellite elements to be placed and mounted on the surface; and at least one protrusion protruding from the surface.

In an embodiment of the invention, the satellite system comprises protrusion contacting the surfaces during additive manufacturing and preventing the panels from bending during production.

In an embodiment of the invention, the satellite system comprises hinges which protrude from the panels in the first position (I) so that they can be examined non-destructively during production against problems that may arise during production.

In an embodiment of the invention, the satellite system comprises panels and hinges used for micro and/or nano satellite production such as 1U cubesat.

In an embodiment of the invention, the satellite system comprises panels and hinges produced with materials to be used for satellite production such as Ti-6Al-4V or Al—Si-10Mg.

In an embodiment of the invention, the satellite system comprises panels and hinges which are produced by additive manufacturing methods such as selective laser melting or fused deposition modeling.

4

BRIEF DESCRIPTION OF THE DRAWINGS

The satellite system realized to achieve the object of the present invention is illustrated in the attached drawings, in which.

Figure 1:
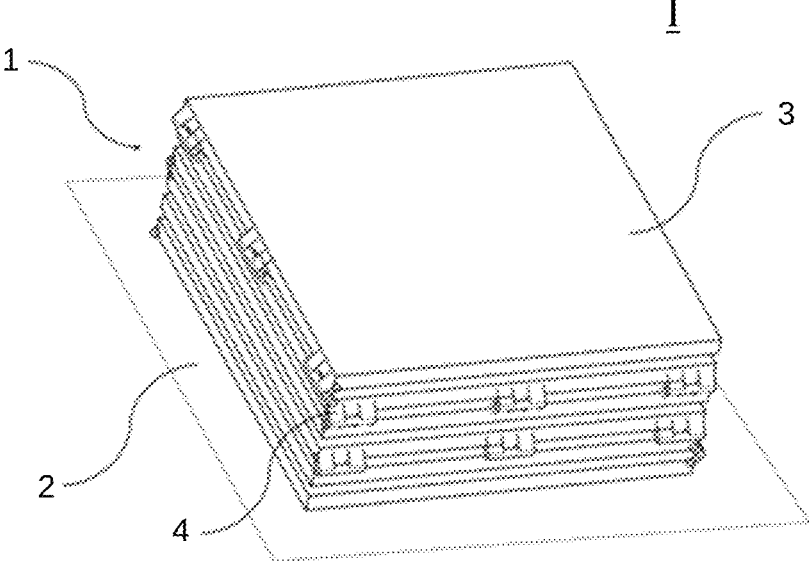
FIG. 1 is a perspective view of the panels and hinges in the first position (I).

All the parts illustrated in figures are individually assigned a reference numeral and the corresponding terms of these numbers are listed below:

1. Satellite System
2. Table
3. Panel
4. Hinge
5. Recess
6. Protrusion
(E) Satellite Elements
(B) Fasteners

DETAILED DESCRIPTION

Figure 2:
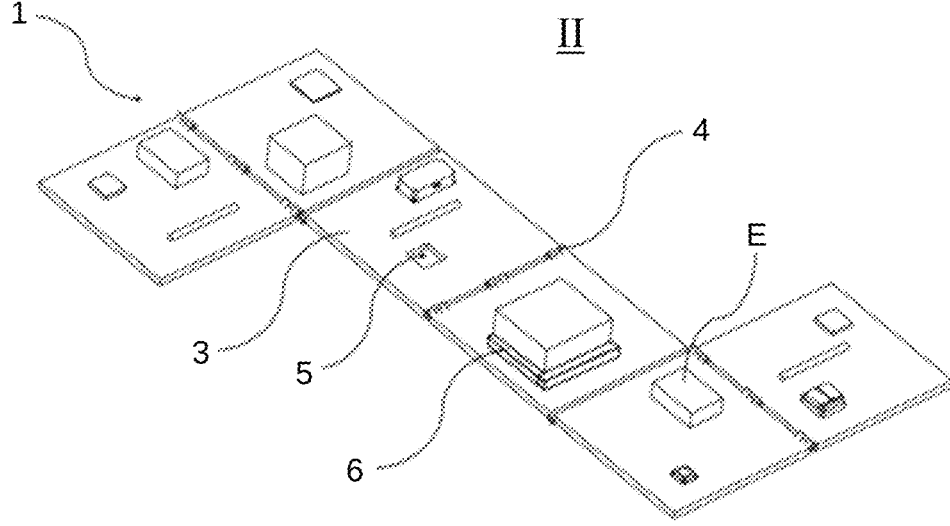
FIG. 2 is a perspective view of the satellite elements (E), panel and hinges in the second position (II).

The satellite system (1) comprises a table (2) on which additive manufacturing is carried out; a plurality of panels (3) which are produced by the additive manufacturing method and surround a plurality of satellite elements (E) such as payload, satellite electronic circuits and mechanisms such that they protect the satellite elements (E) from space conditions, wherein satellite elements (E) are mounted on the panels (3) in a removable manner; at least one hinge (4) which allows the panels (3) to rotate around each other, and produced by additive manufacturing method in an integrated manner with the panels (3) (FIG. 1, FIG. 2).

The satellite system (1) of the invention comprises panels (3) produced in a foldable manner such that they are opposite to each other and almost completely parallel with each other (FIG. 1, FIG. 2).

In satellite systems (1), panels (3) are used, on which the satellite elements (E) are mounted, which surround the satellite elements (E) so as to protect them from external factors such as temperature changes in the space and satellite debris, and on which the satellite elements (E) are mounted removably. The panels (3) are mechanically connected to each other by the hinges (4) and folded relative to each other by means of the hinges (4). Panel (3) and hinges (4) are produced in an integrated manner with each other using additive manufacturing method.

Thanks to the foldable panels (3), storage and transportation of the satellite system (1) by stacking is facilitated. In addition, as the panels (3) are foldable, assembly of the satellite elements (E) on the panel (3) is facilitated.

In an embodiment of the invention, the satellite system (1) comprises panels (3) produced on the table (2) as folded during additive manufacturing such that they are opposite to each other and almost completely parallel with each other. The panels (3) are produced on the table (2), folded in the axis of rotation of the hinges (4), one on top of the other or side by side. Thus, it is possible to produce panels (3) and hinges (4) in smaller tables (2) in integration with each other. Thanks to the additive manufacturing method, production can be made in shapes and positions that cannot be produced by conventional methods. At the same time, production is carried out with most of the assemblies completed. Thus, satellite production is accelerated. Furthermore, the number of fasteners (B) used in the connections between the parts decreases, resulting in a decrease in the total mass.

Figure 3:
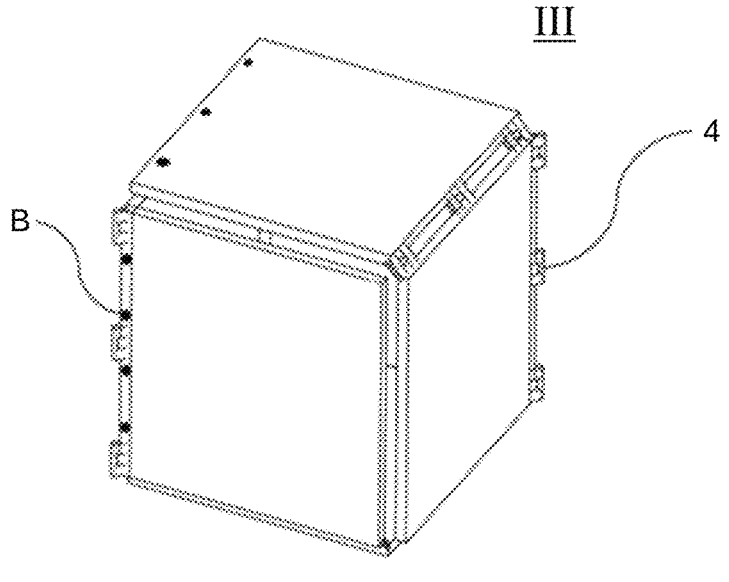
FIG. 3 is a perspective view of the satellite system in the third position (III).

In an embodiment of the invention, the satellite system (1) comprises panels (3) which have a first position (I) in which the panels (3) are folded such that they are opposite and almost completely parallel to each other, a second position (II) in which the panels (3) are unfolded from the first position (I) by rotating the panels (3) relative to each other by means of the hinges (4), and during which the satellite elements (E) are mounted, and a third position (III) in which the panels (3) are folded from the second position (II) by means of the hinges (4), thereby fixing the panels (3) to each other by fasteners (B) such as pins and bolts such that they form an almost completely closed prism. After the assembly of the satellite elements (E) is completed, the panels (3) are closed by means of the hinges (4), allowing the panels (3) to be joined. Thus, additional fasteners (B) required to join the panels (3) are reduced and the panels (3) can be joined together more easily (FIG. 1, FIG. 2, FIG. 3).

Figure 4:
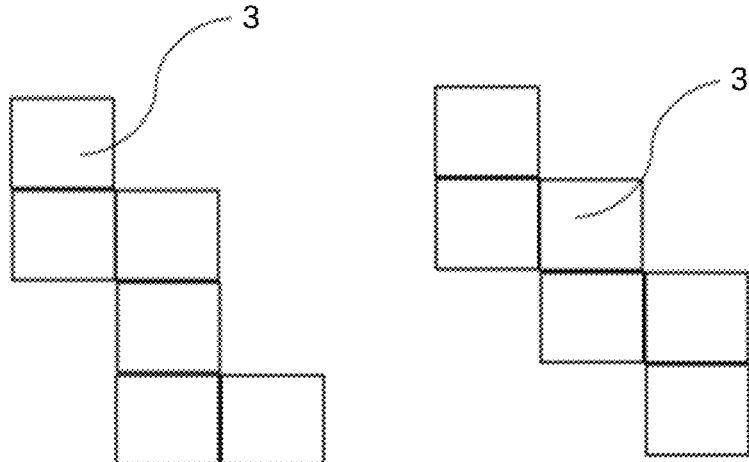
FIG. 4 is a schematic view of the panels.
Figure 5:
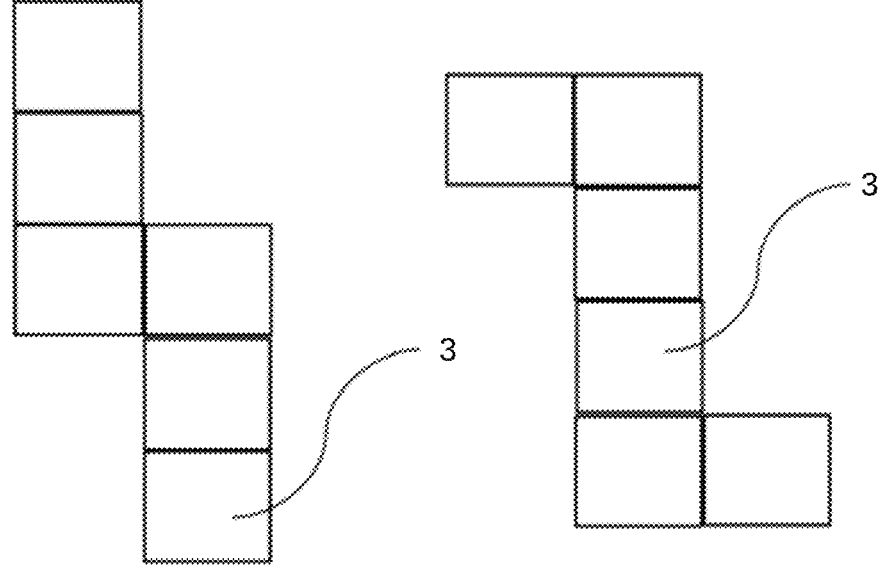
FIG. 5 is a schematic view of the panels.

In an embodiment of the invention, the satellite system (1) comprises panels (3), each of which is connected to maximum two panels (3) by means of hinges (4), so that in the first position (I) only the panels (3) connected with each other remain almost completely opposite to each other. In case the panels (3) are produced in connection with more than two panels (3), there would be at least one panel (3) not connected with one of the panels folded between the panels (3) that are folded on top of each other. This causes at least one hinge (4) to be designed differently. Since the panels (3) are connected with two other panels (2) at max, it is enabled that all the hinges (4) in the satellite system (1) are produced almost exactly the same (FIG. 4 and FIG. 5).

In an embodiment of the invention, the satellite system (1) comprises quadrangle panels (3) and a third position (III) in which the panels (3) are joined to form a rectangular prism.

In an embodiment of the invention, the satellite system (1) comprises at least one recess (5) and/or at least one protrusion (6) which are located on the panel (3) and act as a guide for the positioning of the satellite elements (E) on the panel (3), wherein the protrusion (6) protrudes from the panel (3). The recess (5) and protrusions (6) are produced in integration with the panel (3), and thus, unlike the conventional production methods, it is enabled that the satellite elements (E) are assembled in pre-designed areas in a faster manner.

In an embodiment of the invention, the satellite system (1) comprises protrusion (6) which contacts the panels (3) during production by additive manufacturing and carries the forces caused by the weight of the panels (3), thus preventing the deformation caused by bending of the panels (3) during production. Protrusions (6) located on the panel (3) reduce the number of support elements required during additive manufacturing by carrying the panels (3).

In an embodiment of the invention, the satellite system (1) comprises hinges (4) which protrude from the panels (3) in the first position (I) so that they can be visually examined during production. Therefore, errors in the production of hinge (4) during additive manufacturing can be detected before the production is completed.

In an embodiment of the invention, the satellite system (1) comprises panels (3) and hinges (4) which are used for micro and/or nano satellite production.

In an embodiment of the invention, the satellite system (1) comprises panels (3) and hinges (4) produced with Ti-6Al-4V or Al—Si-10Mg materials.

In an embodiment of the invention, the satellite system (1) comprises panels (3) and hinges (4) produced by selective laser melting or fused deposition modeling methods.

The invention claimed is:

1. A satellite system (1) comprising:
   a table (2) on which additive manufacturing is carried out;
   a plurality of panels (3) which are produced by additive manufacturing; and
   at least one hinge (4) on each of the plurality of panels (3) so that each two adjacent ones of the plurality of panels (3) rotate around each other, and which is produced by additive manufacturing in an integrated manner with associated ones of the plurality of panels (3), wherein the plurality of panels (3) are produced in a foldable manner such that the plurality of panels (3) have a first position (I) in which each of the plurality of panels (3) are folded such that the panels (3) are stacked vertically on top of each other, a second position (II) in which the plurality of panels (3) are unfolded from the first position (I) by rotating each of the plurality of panels (3) relative to each other by the associated hinges (4) so that the plurality of panels (3) are parallel to each other, and a third position (III) in which the panels (3) are folded from the second position (II) by the associated hinges (4) and fixed to each other by fasteners such that the plurality of panels (3) form a closed prism, wherein each of the plurality of panels (3) is connected to a maximum of two of the plurality of panels (3) by the associated hinges (4).

2. The satellite system (1) according to claim 1, wherein each of the plurality of panels (3) forms a quadrangle so that the plurality of panels (3) form a rectangular prism when joined in the third position (III).

3. The satellite system (1) according to claim 2, wherein each of the hinges (4) extend outward from the plurality of panels (3) in the first position (I) to allow visual examination of the plurality of panels (3) during production.

4. The satellite system (1) according to claim 1, further comprising at least one recess (5) and/or at least one protrusion (6) located on at least one of the plurality of panels (3) and which act as a guide for the positioning of satellite elements thereon.

5. The satellite system (1) according to claim 1, further comprising at least one protrusion (6) located on each of the plurality of panels (3) which contacts an adjacent one of the plurality of panels (3) during production by additive manufacturing and carries forces caused by a weight of the adjacent one of the plurality of panels (3).

* * * * *